July 6, 1948.

G. G. LANDIS ET AL 2,444,834

HIGH SPEED ARC WELDING

Filed June 2, 1944

INVENTORS
GEORGE G. LANDIS and
NORMAN J. HOENIE.
BY
Oberlin, Limbach & Day.
ATTORNEYS Patented July 6, 1948

2,444,834

UNITED STATES PATENT OFFICE 2,444,834

HIGH-SPEED ARC WELDING

George G. Landis, South Euclid, and Norman J. Hoenie, Cleveland Heights, Ohio, assignors to The Lincoln Electric Company, Cleveland, Ohio, a corporation of Ohio Application June 2, 1944, Serial No. 538,366

7 Claims. (Cl. 219—10)

1

The present improvements, relating as indicated to arc welding, have more particular regard to methods of arc welding in which a metallic electrode or weldrod of indefinite length is employed, such rod or wire being supplied to the arc as the end thereof is melted off incidentally to the welding operation.

The use of weldrod or wire of indefinite length in the manner thus generally described is of course well known in so-called automatic and semi-automatic methods of arc welding, just as the use of short lengths of rod or wire has long been known in methods of hand welding. Indeed very extensive use has been made of both methods despite certain manifest difficulties which have always attended such use.

Thus in the case of welding by hand with the use of metallic electrodes of relatively short length, aside from the fact that such electrodes require to be changed as they are used up, with consequent interruption of the operation and wastage of unused portions of the electrodes, the operation has called for considerable manipulative skill, particularly in striking the arc and maintaining the arc at the proper length to secure at the same time maximum production and a sound weld.

Indeed, in order to strike the arc, more especially where A. C. current is being used, it has been found desirable, if not necessary, initially to provide a current of higher value than that required to maintain the arc during the welding operation proper. In order thus to boost the current momentarily at the time the arc is being struck, special controls are of course required and these may become quite complicated if the value of the current is thus to be increased above and then restored to normal by automatic means.

In the case of the so-called automatic and semi-automatic methods of arc welding it has been attempted to duplicate so far as possible by mechanical means the manipulation of the weldrod by a skilled operator. Thus in all such systems wherein the welding electrode (rod or wire) is continuously fed to the work it has been considered necessary to automatically vary the rate of feed so as to maintain the arc. The same is true of the semi-automatic process which differs from the automatic principally in that no means are provided to produce relative motion of the work under the arc. However, in the case of both such methods, in order to maintain the arc it has been necessary to provide complicated regulating means for the feeding of the electrode, such as relays for reversing the direction of such feed

2 when the arc has been struck or becomes too short, as well as means for varying the speed of the motor which actuates the feed mechanism so as to increase or decrease the rate at which the electrode is fed.

The regulating means thus required in connection with such existing systems of welding, to be at all effective, must be highly sensitive in their response to change in conditions, with corresponding complication of apparatus. Thus it has long been recognized that the utilization of the arc current for regulation of the rate of electrode feed presents the difficulty that such current does not vary sensitively with the permissible changes in arc voltage.

One principal object of the present invention is to provide a method of arc welding in which the weldrod or wire may be fed to the work at a predetermined substantially uniform rate, i. e. without requiring any such feed regulating means either for the starting of the arc or its maintenance during the continuation of the welding operation. A further object is to provide a method or system whereby the arc may be immediately and directly struck and the welding operation may thereupon proceed without any change in the character of the current, or change in the direction or rate of feed of the rod or wire which constitutes the electrode. In other words, all that is necessary is to bring the electrode into contact with the work in order to initiate the operation and to withdraw such electrode in order to terminate the operation. Still another object is to provide a method or system wherein the welding speed, or in other words the rate of electrode burn-off, is greatly increased over that possible by any method heretofore known.

Whereas with normal welding currents using a bare wire electrode of $3/16''$ diameter, such electrode under known methods of arc welding can be consumed, i. e. melted down in the arc, at a rate of approximately 8 inches per minute and a similar electrode $1/16''$ in diameter can be consumed at the rate of about 18 inches per minute, we have found it possible by our improved method to increase the rate at which the electrode is melted down (usually referred to as rate of "burn-off") as much as twenty or thirty times; for example, to feed a $1/16''$ wire electrode at the rate of from 120 to 600 inches per minute and at the same time obtain a weld that will be satisfactory in every respect. This startling result is based on the discovery that by properly relating the diameter of the electrode and the value of the current employed, so as to cause substantially instantaneous fusion of such electrode whenever the end thereof comes into contact with the work-piece, the maintenance of the arc becomes a relatively simple matter, and the efficiency of the operation is greatly increased. Moreover, all the difficulty attendant upon the "sticking" of the weldrod to the work-piece whenever it is accidentally or otherwise brought into contact therewith is eliminated.

Since, as indicated, in our improved method of welding bare wire electrodes are employed, a layer of flux will desirably be deposited along the line to be welded so as to protect the highly heated molten metal, which results from the operation, from oxidation and other detrimental effects where exposed to the atmosphere. Various known compositions of flux may be employed, but such flux will desirably be in dry, granular or powdered form, and of course should contain no ingredient that will be detrimental to the weld. Preferably, and most conveniently, such flux layer will be deposited simultaneously with the welding operation, the depth of the layer being sufficient to permit the arc to be submerged therein.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

Figure 1:
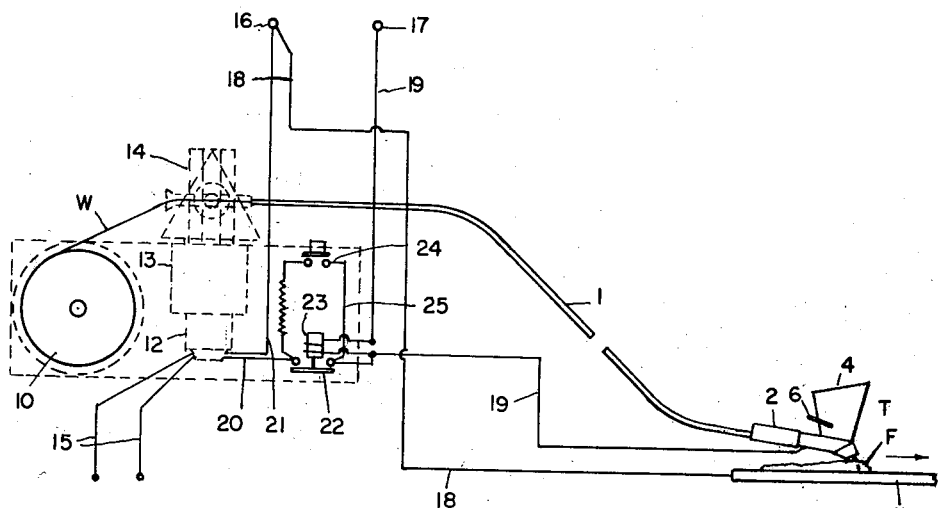
Fig. 1 is a diagrammatic representation of one illustrative form of apparatus suitable for carrying out our improved method of arc welding.

Referring to the illustrative apparatus as diagrammatically shown in Fig. 1, this involves a more or less familiar combination of manually operated tool T, flexible tube or conduit 1 through which the welding electrode or wire W is fed to such tool, and means for supplying welding current to such wire at or near the point of its emergence from the tool T.

Figure 2:
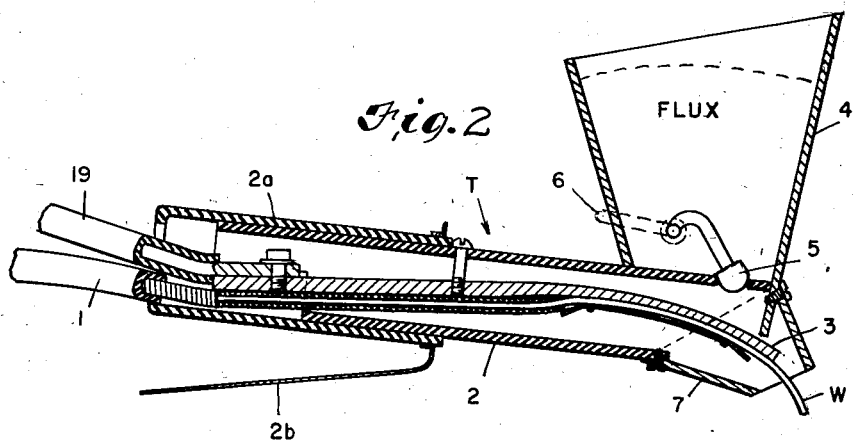
Fig. 2 is a sectional view on a larger scale, and somewhat more detailed in character, of the welding tool which forms one part of such apparatus.

The welding tool, as further illustrated in Fig. 2, comprises in effect simply a handled tubular body 2 of insulating material attached to the flexible tube or conduit 1 adjacent the end thereof from which the wire thus emerges, and a curved contact member 3 within such body, which is connected in the welding circuit as will be presently described, such contact member being so disposed that the weldrod or wire, as it is fed forwardly, presses thereagainst and is bent in a downward direction so that it emerges from the tool at an angle to the position occupied in passing through the handled body 2. The handle 2a, whereby the tool is designed to be held, is desirably provided with a guard 2b to protect the operator's hand.

The tool also includes a container in the form of a small hopper 4 for the flux, which, as previously stated, is desirably fed onto the line to be welded simultaneously with the welding operation. As shown, such hopper is mounted on the forward end of body 2 and the lower discharge end thereof is located just above contact member 3. The discharge of the flux from the hopper is controlled by a gate 5 normally held in closed position by gravity but adapted to be opened by a lever 6 disposed adjacent the body 2 for convenient manipulation. Attached to the forward end of body 2 is a hollow extension or nose 7, preferably of copper, through which the wire W centrally projects as it is fed forward and by which the flux from hopper 4 is directed around such wire onto the work-piece.

The welding current, as to which further particulars will be presently given, may be taken from any suitable source, e. g., from the terminals 16 and 17 of a welding machine (not shown) which will be provided with the usual means for varying the voltage and amperage of the current, as may be found desirable for any particular operation. However it is not contemplated nor necessary that any changes in the setting of such machine, or in other words, of the value of the welding current, will require to be made during the welding operation, or in fact for any given set-up, i. e., any operation in which it has been determined at what rate the weldrod or wire is to be fed to the work and the current appropriate for the particular operation has been selected.

One of the aforesaid terminals, preferably the positive terminal 16, is connected by means of a lead 18 with the work-piece W' while the other, negative terminal 17 is connected by a lead 19 with contact member 3 of the tool T (see Fig. 2). These leads are shown diagrammatically only on Fig. 1, but will of course consist of suitably insulated flexible conductors of adequate current carrying capacity, and in the case of lead 19, this may if desired be attached to the flexible tube or conduit 1 through which the weldrod or wire is fed to the tool, so that, as the latter is moved about, said lead and conduit may be simultaneously led to the point where the welding operation is being carried on.

The weldrod or wire W is fed into the flexible tube or conduit 1 from a reel 10 suitably supported adjacent the opposite end of such conduit from that to which tool T is thus attached. For the purpose of thus feeding the wire, the usual gripping rolls are employed, these being driven by a motor 12 through a reduction gear box 13 and variable friction cone drive 14. Current is supplied to the field of motor 12 through leads 15 from a source of current independent of the welding current, e. g., from an ordinary 125 v. power line.

Operation of the motor 12 is tied in with the welding operation by a series relay 23, which is operated by welding current through the electrode lead 19 to close a switch 22 in one of the armature leads 20, 21. In addition to this relay there is a push button switch 24 which is adapted to connect such armature leads through a resistor. The last-named switch is used to feed the wire manually when not welding, for example, in initially threading the wire through the tube into the holder.

In striking the arc the end of the electrode projecting from the holder is touched to the work. This closes the relay actuated switch 22 which by closing the connection of armature lead 20 to electrode lead 19 causes the motor to start. When the welding operation ceases or when the operator pulls the holder away from the work the relay automatically opens said switch 22 and the motor stops feeding the wire.

The armature of the motor, when in operation, is connected across the arc and such operation accordingly is responsive to changes in the arc length.

The manner in which an apparatus, such as the illustrative one just described, will be utilized in carrying out our improved method will now be set forth. Particularly where designed for hand operation, as in the case of such illustrative apparatus, the weldrod or wire used will be of relatively light gauge, e. g. $\frac{1}{16}$" dia. or even $\frac{3}{64}$" dia. For use in welding operation, whether by hand or otherwise, the voltage of the welding current must necessarily, for well understood reasons, be kept relatively low. Accordingly a voltage of from approximately 25 to 50 v., such as has heretofore been customarily employed, will be utilized; however, such current will be of much higher volume, i. e. amperage, and consequently the current density per square inch or circular mil of electrode cross-section will be much higher, than has ever heretofore been utilized, so far as we are aware. At the same time the rate at which the electrode or wire is fed to the work will be much greater than in current practice.

As indicated above, for any particular operation the current values (voltage and amperage) will be determined by proper adjustment of the welding machine or other source of supply for such current. At the same time, by adjusting the variable friction cone drive 14, the rate at which the weldrod or wire is fed through the flexible tube to the welding tool is likewise determined. Then during the welding operation no changes, automatic or otherwise, are made in either such settings.

Figure 3:
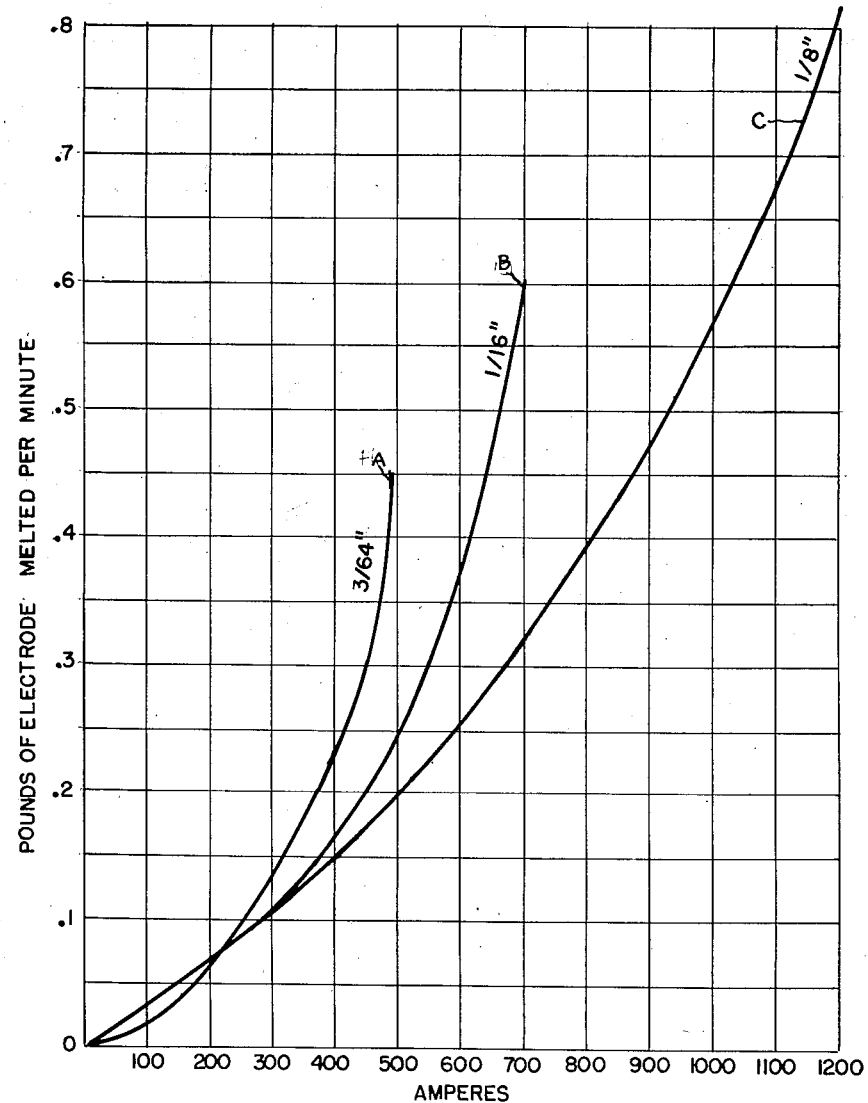
Fig. 3 is a chart showing electrode burn-off versus current, where our improved method of arc welding is employed, as compared with prevailing methods.

As illustrating the results obtained by our new process, reference is made to the chart, Fig. 3, on which lines A, B and C show the electrode burn-off, i. e. the amount in pounds of weldrod or wire of three different sizes that is melted down at the arc when using current varying in volume from 0 to 1200 amperes.

The following examples will serve as further specific illustrations. Thus taking a weldrod or wire of $\frac{3}{64}$" d., a current of 400 a. and approximately 40 v. at the arc, such wire will be fed at the rate of 470 inches per minute, giving a wire burn-off of 0.23 lb. per minute. With a current of 500 a. and somewhat higher voltage, e. g. 45–48 v., the rate of feed of the same $\frac{3}{64}$" d. wire will be 920 inches per minute giving a wire burn-off of 0.45 lb. per minute. Similarly taking $\frac{1}{16}$" d. wire and a current of 500 a. and arc voltage of approximately 40 v., the rate of feed will be 290 inches per minute, giving a wire burn-off of 0.25 lb. per minute; while at 600 a. and voltage of approximately 45, the rate of feed will be 440 inches per minute, giving a wire burn-off of 0.40 lb. per minute.

In general, it may be stated that our improved process is characterized by a rate of electrode feed in excess of ten feet per minute, and by the employment of a current value sufficiently high so that the welding circuit between the work and electrode may be maintained for a period longer than one second only by feeding the electrode toward the work.

From the foregoing and as shown on the chart, Fig. 3, where current of such higher amperage is used, the rate of electrode burn-off is approximately twice that obtained by the best known practice using automatic welding equipment and this is accomplished without any increase in wattage, i. e. current consumption. Otherwise stated, we are able to fuse twice as much metal, by our method, with a given power consumption than has heretofore been possible.

Our improved method is particularly adapted for arc welding by hand since all that is required of the operator in order to initiate the welding operation, assuming the weldrod or wire has been fed forwardly through the flexible tube to the welding tool, so as to project slightly beyond the nose 7 of the latter, is to contact such projecting end with the work. As previously described, the closing of the welding circuit immediately closes switch 22, thus setting motor 12 in operation to feed the weldrod or wire continuously to the work at the predetermined, substantially uniform, rate. As indicated, the current value, having regard to the cross-sectional area of the weldrod or wire, is sufficiently high so that when the latter is thus brought into contact with the work, the circuit will be broken substantially instantaneously by the end of the weldrod or wire burning off, thereupon establishing an arc between such end and the work-piece. Thereupon, all that the operator need do to continue the operation is to hold the welding tool with the nose thereof spaced from the work-piece a distance sufficient to deposit a layer of fluxing material of proper depth to submerge the arc thus produced. The rate at which the tool is moved along the work will depend upon the character of the seam which it is desired to produce. The operation continues unaffected if the tool is held in one place, the only result being to build up a larger body of weld metal at such point. If a narrow or wide seam is desired, the tool is simply moved along the line to be welded at a greater or lesser speed. When the operator desires to interrupt the welding operation it is merely necessary to move the tool quickly away from the work-piece, whereupon the arc is broken and at the same time, due to interruption of the welding circuit, the operation of the feed motor 12 is stopped.

While the flux layer shown at F in Fig. 1, in which the arc is submerged during the welding operation, may be deposited in any desired manner, e. g. in advance of such welding operation instead of simultaneously therewith, provision is made in the illustrated apparatus for simultaneous deposit of such layer. As previously explained, the flux gate may be conveniently manipulated by use of the operator handling the welding tool, so as to allow flux from the hopper to flow onto the work-piece at the required rate to build up and deposit a layer of necessary depth as the tool is moved along such work-piece. Actually the gate may be simply held open and by keeping the nose of the tool body at a selected distance from the work-piece, as the tool is moved along the latter, a layer of corresponding depth will be laid down. So as not to make the tool too heavy for convenient manipulation, the hopper will desirably be of small size and the operator will replenish it from time to time as required from a source of supply located within reach of his free hand.

Where, as just described, the end of the weldrod is manually moved to traverse the line to be welded and granular flux material is simultaneously deposited along such line to form a layer wherein such weldrod enters, the traversing movement of said weldrod end may be timed by the depositing of a layer of such material of approximately uniform depth. In this way, despite the fact that the arc is more or less obscured and the deposited weld metal or bead hidden from the operator's view, the operation can nevertheless be carried on with assurance that a satisfactory weld is being obtained. This method of controlling the operation is not a part of the present invention but is disclosed and claimed in the copending application of L. K. Stringham, filed March 17, 1944, Serial No. 526,935, now Patent No. 2,402,938, dated June 25, 1946.

The precise manner in which the weld metal from the rod or wire is melted off is not readily ascertainable from such observation as we have been able to make. Not only does the operation proceed with great rapidity, but under proper conditions the arc, as indicated, will be submerged in the deep flux layer. However, characteristic features of the operation are (1) that fusion of the end of the electrode or wire occurs substantially instantly upon bringing the end thereof in contact with the work-piece; (2) such weldrod end will not stick or freeze to the work-piece; (3) the volume, or intensity per circular mil section of electrode, of the current employed is considerably higher than has ever heretofore been deemed feasible in an arc welding operation; (4) the rate of electrode burn-off is correspondingly higher; and (5) the amount of such burn-off compared with the current consumed is greatly increased, up to twice as much as is possible under the best prevailing practice.

Due to the the fact that, as noted under (1) above, the end of the electrode fuses substantially instantly upon being brought into contact with the work, no change in the current setting, either manual or automatic, requires to be made. By this it is meant that the welding generator will be adjusted so as to provide the desired welding current value for the particular operation in hand, and no change in such adjustment, or "setting" will require to be made in order to strike the arc.

Actually, except in the case current is secured from a constant current machine, there will be a certain increase of current at striking over that flowing during the welding operation, due to the fact that at striking, when the electrode is shorted to the work, the normal voltage across the arc is not included in the circuit. In other words, the condition as to current which is referred to is that it is derived from a machine having a constant static volt ampere curve irrespective of whether it be a constant current.

In confirmation of the statement that, as noted under 3 above, the volume or intensity of the current employed is considerably higher than has ever heretofore been deemed feasible in an arc welding operation, the current density in amperes per square inch for the several specific previously given illustrations will upon calculation be found to be as follows, viz.:

| Electrode Diameter, inches | Current, Amperes | Current Density, Amperes per square Inch |
|---|---|---|
| ¼₆ | 400 | 230,000 |
| ¼₆ | 500 | 290,000 |
| ⅛ | 500 | 160,000 |
| ⅛ | 600 | 200,000 |

From the foregoing it will be evident that we utilize a very much higher current density than has ever heretofore been deemed feasible in arc welding operation. Thus in welding with ¹⁄₁₆" d. electrode, even with current as low as 150 a. a current density of 50,000 amperes per square inch is obtained. We have found that when employing an electrode in the form of a wire of approximately ¹⁄₁₆" diameter a welding current of from 150 to 600 amperes may desirably be employed, or a range of current density from approximately 50,000 to 200,000 amperes per square inch. As indicated in the table of examples given above, however, still higher current densities, e. g. 290,000 amperes per square inch, may on occasion be desirable.

The relation of the current value to the cross-sectional area of the electrode may be further defined as such that the current-conducting end of such electrode, if not advanced to the work, will be melted off in less than one second, where such end exceeds one-half inch in length, or in other words, to a point where the gap produced by such melting cannot be spanned by the resultant arc.

The foregoing results may be explained (although we do not wish to be limited to any particular theory of operation) by the observed fact that the current employed is of such value in relation to the cross-sectional area of the weld-rod or wire as to cause substantially instantaneous fusion of the end thereof whenever such end comes 'nto contact with the work-piece. This we believe is not merely a matter of degree, but, due to the use of a current of much higher density than has ever heretofore been employed in arc welding, a new and distinct phenomenon occurs. Heretofore it has always been assumed that, in arc welding heating at the electrode end increases in direct proportion to the current employed. Indeed the rate of burn-off in the case of a metallic electrode is commonly used as a means for measuring the current employed, since within the range of current densities heretofore utilized the effect of heating by resistance of the electrode by passage of current therethrough has been a negligible, or at least an entirely minor, factor. However, we have found that at a point where the current density approximates 60,000 amperes per square inch, the resistance heating begins to be the dominant factor and the behavior of the arc, particularly in the matter of its striking, is radically different from that observable in arc welding operations as heretofore carried on. Furthermore, since resistance heating increases as the square of the current, and not in direct proportion thereto, as in the case of heating at the arcing end of the electrode, a hitherto unrealized range of welding capacity is opened up. In other words, when the current density passes the point where heating by resistance thus becomes the dominant factor, further increase in such density results in a burn-off rate approximately proportional to the square of the current.

The substantially instantaneous melting off of the end of the electrode when brought into contact with the work-piece may accordingly be explained as due to the use of a welding current of sufficiently high density to raise such end to the melting point by resistance heating alone, and such resistance heating continues as a dominant factor after the arc is struck. The only limitations as to the upper limit of the current density which may be employed are purely physical, due to the characteristics of the available equipment.

Normally such contact of electrode or weldrod with work-piece will not occur except in initiating the operation, but it has been observed that by moving the tool quickly toward the work-piece, or by unduly increasing the rate of feed of the wire, the end of the latter may be caused to bump against the work-piece. It is also quite possible that once a pool of molten metal is formed, since the end of the electrode normally extends below the upper level of such pool, the latter may be influential both in promoting fusion of the electrode and preventing the freezing or sticking of its end to the work-piece.

It is not meant by the foregoing to imply that the electrode actually contacts the pool of molten metal, since in order to obtain the stated results it is essential at all times that an arc be present. However, owing to the intensity of the latter and the rapid advancing movement of the electrode, the end of the electrode apparently extends down to the upper level of the work-piece and the pool of molten metal formed by the arc, or of metal and commingled flux where the welding is carried on through a layer of flux as is preferred, rises to a level above such end immediately following the arc.

The current flow at the end of the electrode is of course highly concentrated due to the volume of such current and the small diameter of the wire and the resulting arc is correspondingly narrow and long and capable of penetrating deeply without undue spreading.

While we have shown and described an apparatus suitable for hand operation, our improved method is of course equally adapted for use with apparatus of the so-called automatic type in which the electrode and work-piece are moved relatively to each other by mechanical means. Such traversing movement may be obtained in any desired way without any change being required in the essential features which characterize our method. In particular, no additional controls or regulating means for varying the rate of feed of the weldrod or wire, or the character of the current in order to maintain the arc, will be required.

Other modes of applying the principle of our invention may be employed instead of the one explained, change being made as regards the method herein disclosed, provided the step or steps stated by any of the following claims or the equivalent of such stated step or steps be employed.

Aspects of the apparatus disclosed herein are shown and claimed in our pending application filed May 22, 1947, Serial No. 749,780, as a continuation-in-part hereof.

We therefore particularly point out and distinctly claim as our invention:

1. In a method of arc welding wherein an arc is established between a metal work-piece and the end of a metallic electrode, the steps which comprise supplying to such electrode an arc welding current having a high current density of at least 60,000 amperes per square inch of electrode cross-section effective substantially instantaneously to melt off the end of such electrode when the latter is brought into contact with the work-piece, contacting such work-piece with such electrode whereupon an arc is established between such end and work-piece, and thereupon continuously feeding such electrode to such work-piece at a rapid rate effective to maintain such arc therebetween, while continuously supplying such arc welding current thereto.

2. In a method of arc welding wherein an arc is established between a metal work-piece and the end of a metallic electrode, the steps which comprise supplying to an electrode in the form of a wire of approximately $\frac{1}{16}$" diameter an arc welding current of from 150 to 600 amperes effective substantially instantaneously to melt off the end of such electrode when the latter is brought into contact with the work-piece, contacting such work-piece with such electrode whereupon an arc is established between such end and work-piece, and thereupon continuously feeding such electrode to such work-piece at a rapid rate effective to maintain such arc therebetween, while continuously supplying such arc welding current thereto.

3. In a method of arc welding wherein an arc is established between a metal work-piece and the end of a metallic electrode, the steps which comprise feeding such electrode to such work-piece, imposing on the terminal portion of such electrode, when the end thereof contacts such work-piece, an arc welding current of sufficiently high density to raise such end substantially instantaneously to the melting point by resistance heating alone, whereby such contact is broken and an arc is established between such end and work-piece, and continuing to feed such electrode while maintaining such current at correspondingly high density.

4. In a method of arc welding wherein an arc is established between a metal work-piece and the end of a metallic electrode, the steps which comprise feeding such electrode to such work-piece, imposing on the terminal portion of such electrode, when the end thereof contacts such work-piece, an arc welding current having a current density of at least 60,000 amperes per square inch of normal electrode cross-section, whereby such end is raised to the melting point by resistance heating alone, such contact is broken and an arc is established between such end and work-piece, and continuing to feed such electrode while maintaining such current at correspondingly high density.

5. In a method of arc welding wherein an arc is established between a metal work-piece and the end of a metallic electrode, the steps which comprise feeding such electrode to such work-piece, imposing on the terminal portion of such electrode, when the end thereof contacts such work piece, an arc welding current having a current density of from 60,000 to 290,000 amperes per square inch of normal electrode cross-section, whereby such end is raised to the melting point by resistance heating alone, such contact is broken and an arc is established between such end and work-piece, and continuing to feed such electrode while maintaining such current at correspondingly high density.

6. In a method of arc welding wherein an arc is established between a metal work-piece and the end of a metallic electrode, the steps which comprise feeding to such work-piece an electrode having a diameter of approximately one-sixteenth ($\frac{1}{16}$) inch, imposing on the terminal portion of such electrode, when the end thereof contacts such work-piece, an arc welding current of approximately 500 amperes, whereby such end is raised to the melting point by resistance heating alone, such contact is broken and an arc is established between such end and work-piece, and continuing to feed such electrode while maintaining such current at correspondingly high density.

7. In a method of arc welding wherein an arc is established between a metallic work-piece and the end of a metallic electrode, the steps which comprise striking an arc between the end of such electrode and work-piece and thereupon continuously feeding such electrode to such work-piece while continuously imposing on the terminal portion of such electrode an arc welding current of sufficiently high density to produce more heat by the resistance heating of such terminal portion than is absorbed by such portion from the arc at such electrode end.

GEORGE G. LANDIS.
NORMAN J. HOENIE.

REFERENCES CITED

The following references are of record in the file of this patent:

UNITED STATES PATENTS

| Number | Name | Date |
| --- | --- | --- |
| 1,986,167 | Stresau | Jan. 1, 1935 |
| 2,043,960 | Jones et al. | June 9, 1936 |
| 2,105,079 | Holslag | Jan. 11, 1938 |
| 2,277,654 | Merlub-Sobel et al. | Mar. 24, 1942 |
| 2,315,358 | Smith | Mar. 30, 1943 |

OTHER REFERENCES

Welding Handbook, 1942, page 262, American Welding Society. 33 West 39th Street, New York, New York.